United States Patent
Fujimura

[11] 3,801,389
[45] Apr. 2, 1974

[54] PHOTOELECTRICALLY CONVERTING OPTICAL FIBER AND METHOD OF MAKING THE LIKE

[75] Inventor: Ikuo Fujimura, Kanagawa, Japan
[73] Assignee: Fuji Photo Film Co., Ltd., Kanagawa, Japan
[22] Filed: Dec. 13, 1971
[21] Appl. No.: 207,235

[30] Foreign Application Priority Data
Dec. 26, 1970   Japan.............................. 45-118986

[52] U.S. Cl............................. 156/6, 156/7, 156/24, 156/193, 156/232, 250/227, 350/96 B
[51] Int. Cl.............................................. B23p 15/00
[58] Field of Search............ 250/227, 211 R, 211 J; 350/96 R, 96 B; 156/6, 7, 24, 193, 232

[56] References Cited
UNITED STATES PATENTS

| | | | |
|---|---|---|---|
| 3,310,681 | 3/1967 | Hargens............................ | 250/227 |
| 3,164,795 | 1/1965 | Luebbe........................... | 250/211 X |
| 3,215,029 | 11/1965 | Woodcock..................... | 250/227 X |
| 3,056,031 | 9/1962 | McNaney........................ | 250/227 X |
| 3,445,667 | 5/1969 | Dillman............................ | 250/211 |
| 3,042,806 | 7/1962 | Lubin.................................. | 250/211 |
| 3,441,736 | 4/1969 | Kazan............................. | 250/211 X |

*Primary Examiner*—James W. Lawrence
*Assistant Examiner*—D. C. Nelms
*Attorney, Agent, or Firm*—Sughrue, Rothwell, Mion, Zinn & Macpeak

[57] ABSTRACT

The peripheral surface of a portion of an optical fiber is roughed and thereon a photoelectrically converting element is provided, so that light transmitted in the optical fiber is converted into electric signals by the photoelectrically converting element. Such a photoelectrically converting optical fiber is made by taking a model or a replica of an optical fiber, forming a photoelectrically converting element on the replica, roughing the peripheral surface of the portion of the optical fiber from which the replica is taken, and interlocking again the replica to the optical fiber so as to transfer the photoelectrically converting element onto the roughed surface portion. Furthermore, electrically conductive coating is provided on the other portion of the optical fiber except for the roughed surface portion so as to provide a terminal, and also lead wire, for the photoelectrically converting element.

7 Claims, 5 Drawing Figures

PHOTOELECTRICALLY CONVERTING OPTICAL FIBER AND METHOD OF MAKING THE LIKE

BACKGROUND OF THE INVENTION

1. Field of the Invention

The present invention relates to an optical fiber, particularly to an optical fiber enabling light transmission and photoelectric conversion, i.e., a photoelectrically converting optical fiber, and further to a method of making it.

2. Description of the Prior Art

In a facsimile technique, a fiber ribbon, which consists of optical fibers arranged laterally in parallel, is made to be linear at its input end and circular at its output end in cross-section and a photoelectrically converting device is mounted to face the circular output end through a light transmitting member. Thus, in order to convert a light signal transmitted through each optical fiber into an electric signal, it is necessary that the light transmitting member scans onto the circular output end. However, in this conventional art, it has been impossible to convert simultaneously the light signals transmitted through all of the optical fibers into electric signals to provide an output.

In a copying machine, it is not required that image signals are sequentially provided, e.g., as flying spot scanning, whereas it is preferable as a general manner that an image is formed on a recording medium simultaneously in two dimensions, i.e., two dimension simultaneous recording, e.g., as contact duplication, or as one dimension simultaneous recording, for example, as slit image scanning. Such one or two dimension simultaneous recording system enables the relatively high speed recording or copying with utilizing a relatively simple apparatus.

SUMMARY OF THE INVENTION

An object of the present invention is to provide an optical fiber enabling both light transmission and photoelectric conversion, i.e., a photoelectrically converting optical fiber. Another object of the present invention is to provide an optical fiber apparatus including a plurality of optical fibers, in all of which the transmitted light signals are simultaneously converted into electric signals. Still another object of the present invention is to provide an optical fiber apparatus preferably suitable for one dimension simultaneous recording, e.g., as in a copying machine. Yet another object thereof is to provide a method of making such a photoelectrically converting optical fiber.

In order to accomplish the above purposes, it is intended in the present invention that a photoelectric element is provided integrally in an optical fiber. According to the present invention, a photoelectrically converting optical fiber comprises a roughed surface portion of an optical fiber and a photoelectric element formed on the roughed surface portion. The photoelectric element is made by forming a replica of an optical fiber, by contacting an optical fiber having a roughed surface portion with the replica, and by transferring to fix the photoelectric element onto the roughed surface portion of the optical fiber.

A photoelectrically converting optical fiber of the present invention is suitable and effective for one dimension simultaneous recording in a copying machine or the like. That is, if the above-described fiber ribbon is made, for example, of the photoelectrically converting optical fibers of the present invention, it will enable the one dimension simultaneous conversion of light signals into electric signals.

DETAILED DESCRIPTION OF THE INVENTION

Figure 1:
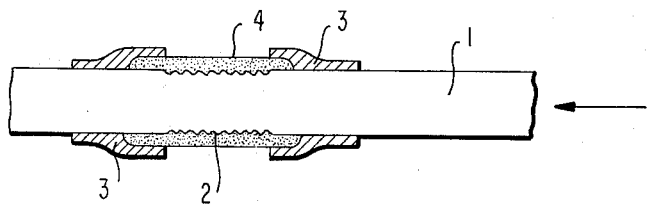
FIG. 1 is an enlarged cross-sectional side view of the main part of the photoelectrically converting optical fiber according to the present invention.

There is shown a photoelectrically converting optical fiber according to the present invention in FIG. 1. A roughed surface portio 2 is formed on the peripheral surface of a part of an optical fiber 1 and a photoconductive element, which comprises an electrically conductive portion 3 and a photoconductive portion 4, is formed and fixed on the peripheral surface, which may be the partial, or the whole, peripheral surface. The electrically conductive portion 3 is made of metal and the photoconductive portion 4 is made of photoconductive material such as CdSe, CdS or the like.

In the photoelectrically converting optical fiber thus constructed, the incident light along the direction shown by the arrow in FIG. 1 passes through the roughed surface portion 2 and is scattered thereby, so that the light is incident to the photoconductive element composed of the electrically conductive portion 3 and the photoconductive portion 4 so as to be converted into electric signals.

The simplest method of making the photoelectrically converting optical fiber according to the present invention will be described in the following.

On the peripheral surface i.e., the outside wall of a part of a glass fiber, abrasives or hydrofluoric acid is sprayed to form a rough surface, then photoconductive material is evaporated thereon, in a vacuum chamber, and electrically conductive material is evaporated onto both of the edge portions thereof with partially overlapping thereon. For example, a roughed surface portion is formed over a part, about 2 mm long, of a glass fiber with 500$\mu$diameter by spraying powdered abrasives onto the outside wall thereof through a fine nozzle. After vacuum evaporation of CdSe in about 1$\mu$ thickness on the roughed surface portion, a heat-treatment; 450° C., 30 mm. in the air is performed thereon. Next, the center portion, about 1 mm wide, of the CdSe layer is masked by metal and then gold is evaporated onto both end portions thereof. The photoelectrically converting optical fiber thus obtained shows a resistance of about $10^4$ ohms. under an illumination of 500 lumens and the dark resistance, about $10^6$ ohms, i.e., it provides a sifficient photocurrent for the output electric signals.

Figure 2:
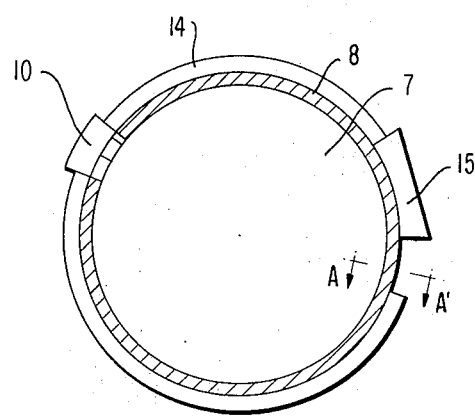
FIG. 2 is a side view of the main part of the fiber ribbon made of the photoelectrically converting optical fibers to illustrate the method of making it.
Figure 3:
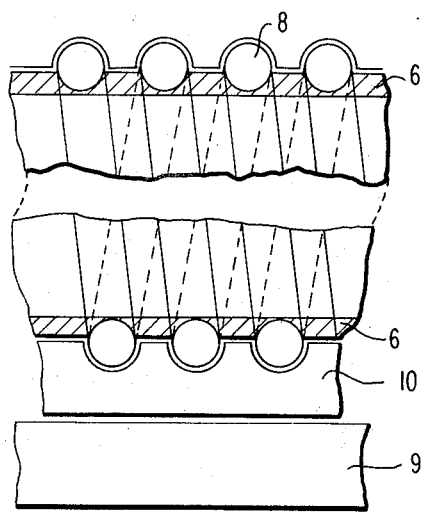
FIG. 3 is an enlarged side view of the necessary part for illustrating the process of making the replica.
Figure 4:
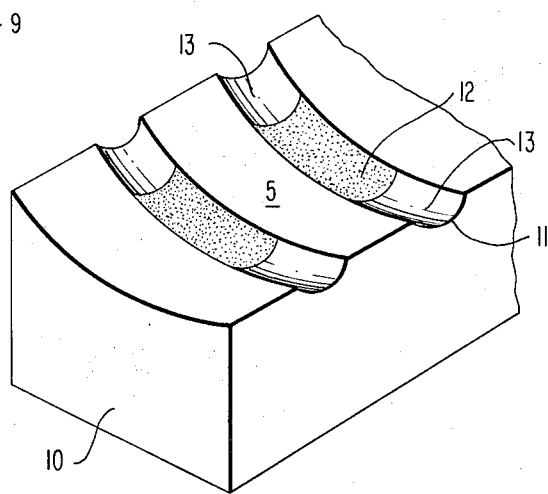
FIG. 4 is a perspective view of the replica on which the photoelectric element is formed.
Figure 5:
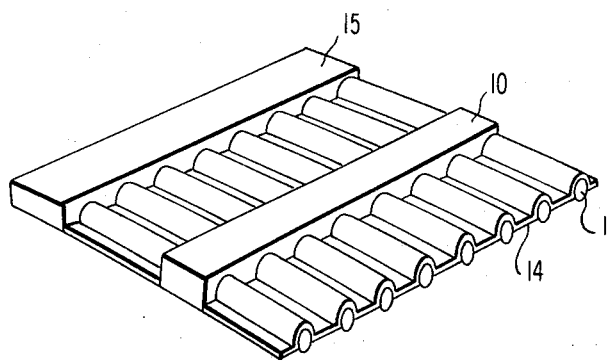
FIG. 5 shows a perspective view of a photoelectrically converting optical fiber ribbon formed when the glass fiber assembly as shown in FIG. 2 is cut along line A—A'.

The following description will be given for illustrating another novel method of making the photoelectrically converting optical fiber according to the present invention, citing the process of making the afore-mentioned fiber ribbon for e.g., facsimile recording, as an example. As shown in FIGS. 2 and 3, a glass fiber 8 covered with electrically conductive coating as disclosed in Japanese Patent Publication No. 18958/'68, is wound around a cylinder 7 on which slow-dry adhesives 6 have been thinly painted and thereby held to be slightly fixed thereon. Next, a replica of the glass fiber is provided by means of the molding replica method, which is well known as a method of providing a subject for an electron microscope. That is, thermoplastic resin 10 for replication is set on a heating plate 9 and the cylinder 7 wound with the glass fiber 8 is put thereon. They are heated at about 90° C. for 5 min. and simultaneously the cylinder 7 is pressed down by about 500 g/cm². Then, being maintained in that state, they are cooled back to room temperature for about 30 min. so as to obtain the replica 11 shown in FIG. 4. On the replica 11, photoconductive material (CdSe) 12 is evaporated in about 1μ thickness and then gold electrode 13 is deposited on both sides thereof. Each groove, i.e., each replica 11 of the glass fiber is electrically isolated from another by polishing the intermediate portions 5 between grooves, i.e., between replicas 11 so as to form a line of photoelectrically converting elements. On the other hand, the electrically conductive coating on the peripheral surface of that part of the glass fiber 8, on which the replica is taken out, is removed to the extent of about 1 mm length by spraying hydrolfuoric acid thereonto and that part is abraded to become a roughed surface portion. Then, the glass fiber with the roughed surface portion is again interlocked and fixed with the above-mentioned replica 11 in which the electrically converting element is provided. Next, as shown in FIG. 2, soft resin is painted onto the other part of the glass fiber 8 so as to form the support layer 14. Furthermore, if necessary, a stiffening member 15 can be adhered onto the edge portion to be scanned by a scanning head. After that, the glass fibers 8 are cut along line A—A' shown in FIG. 2 and detached from the cylinder 7, and thus a photoelectrically converting optical fiber ribbon is obtained.

It may be arbitrarily determined exactly where the replica 11 is taken from the glass fiber 8 wound around the cylinder 7. And, if the photoelectrically converting optical fiber is made by severing a glass fiber 8 that is pre-coated with electrically conductive coating over its whole length, as in this example, it will be possible and accordingly, advantageous, to make use of the electrically conductive coating as the terminal, and also the lead wire, for the photoconductive element.

The above-described method of making a photoconductive optical fiber, which comprises taking out a replica of a glass fiber, and again interlocking the replica having the photoconductive element on the replica, roughing the surface of the replica taken-out portion of the glass fiber, and again, interlocking the replica having the photoconductive element with the roughed surface portion, is not only useful for making a fiber ribbon, but also applicable to making a single photoconductive optical fiber.

What is claimed is:

1. A method of making a photoelectrically converting optical fiber comprising the steps of:
   making a mold impression of an optical fiber;
   abrading the surface of the optical fiber from which the mold impression was made;
   coating the mold impression with photoconductive material and electrically conducting material on both sides of the photoconductive material, and
   joining the abraded optical fiber with the mold impression to contact the photoconductive material and the electrically conductive material with the fiber.

2. A method as in claim 1, where the optical fiber is abraded by spraying hydrofluoric acid on the surface of the optical fiber.

3. A method as in claim 1, where the photoconductive material is evaporated on the mold impression.

4. The method of claim 1 further comprising the step of abrading said optical fiber by spraying powdered abrasive material.

5. The method of claim 3 wherein said photoconductive material is cadmium selenide.

6. The method of claim 1 further comprising applying electrical leads to said optical fiber by evaporation onto said optical fiber of a conductive deposit of gold.

7. The method of claim 1 further comprising winding said optical fiber around a cylinder,
   providing a mold impression having spiral grooves which engage with said optical fiber wound around said cylinder,
   joining said abraded optical fiber with the face of photoconductive material coated on said mold impression, said optical fiber having been painted with soft resin to form a support layer on its winding, and
   cutting said optical fiber and said support layer axially along the surface of said cylinder to form a photoelectrically converting optical fiber ribbon provided with plural pieces of parallel fibers.

* * * * *